Mar. 6, 1923.
A. BEHN ET AL
1,447,746
POWER TRANSMISSION FOR AUTOMOTIVE VEHICLES
Filed Oct. 21, 1920   3 sheets-sheet 1
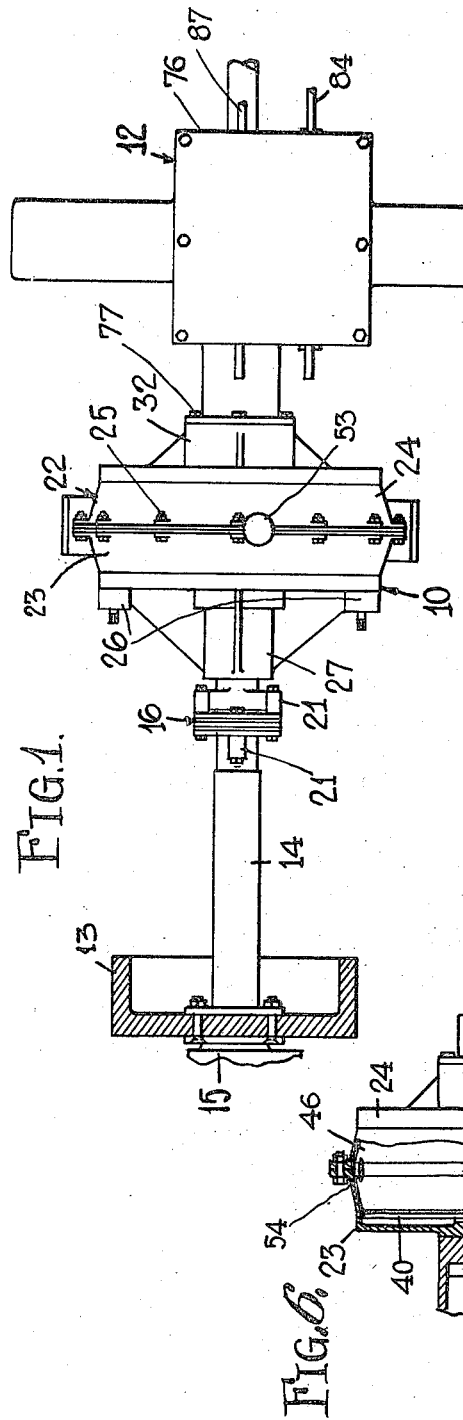
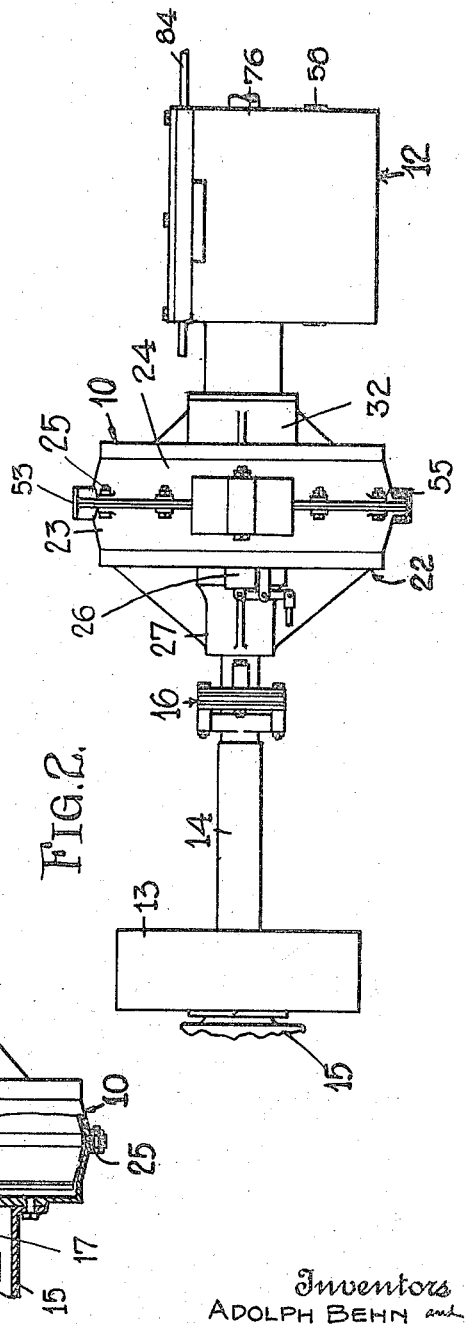
Inventors
ADOLPH BEHN and
JOHN GUSTAV SCHMITT.
By their Attorney Mar. 6, 1923. 1,447,746
A. BEHN ET AL
POWER TRANSMISSION FOR AUTOMOTIVE VEHICLES
Filed Oct. 21, 1920 3 sheets-sheet 2
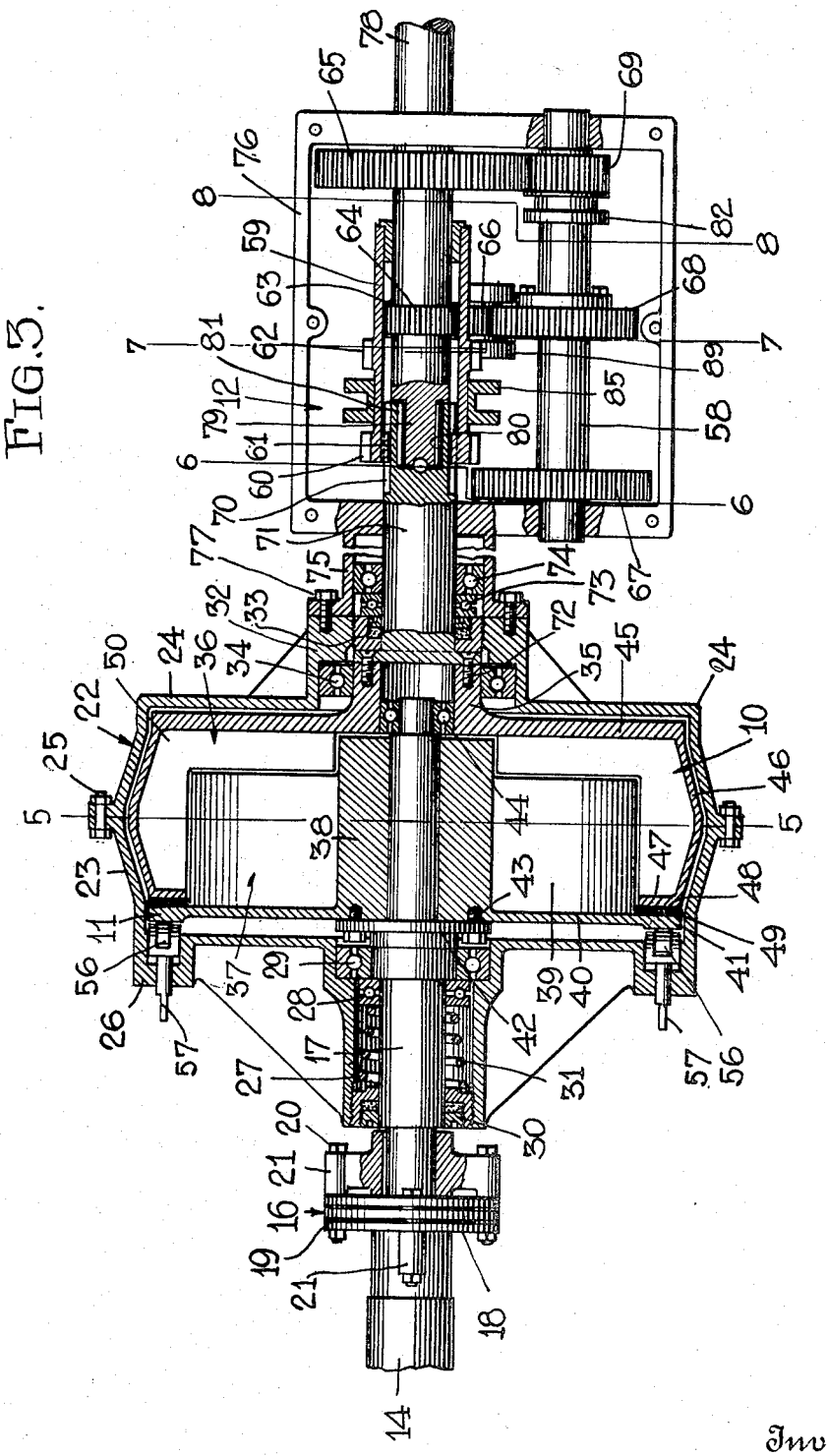
Inventors
ADOLPH BEHN and
JOHN GUSTAV SCHMITT.
By their Attorney Mar. 6, 1923.

A. BEHN ET AL

POWER TRANSMISSION FOR AUTOMOTIVE VEHICLES

Filed Oct. 21, 1920     3 sheets-sheet 3

1,447,746

Inventors
ADOLPH BEHN and
JOHN GUSTAV SCHMITT
By their Attorney
Wm Ebalk Jr.

Patented Mar. 6, 1923.

1,447,746

UNITED STATES PATENT OFFICE.

ADOLPH BEHN AND JOHN GUSTAV SCHMITT, OF BROOKLYN, NEW YORK.

POWER TRANSMISSION FOR AUTOMOTIVE VEHICLES.

Application filed October 21, 1920. Serial No. 418,445.

*To all whom it may concern:*

Be it known that ADOLPH BEHN and JOHN GUSTAV SCHMITT, citizens, respectively, of the United States and the Republic of France, residing at Brooklyn, in the county of Kings and State of New York, have invented certain new and useful Improvements in Power Transmissions for Automotive Vehicles, of which the following is a specification.

Our invention relates to the power transmission of automotive vehicles and more particularly automobiles.

A characteristic of the invention is the provision of an hydraulic driving connection between the power plant and the drive-shaft of the vehicle upon which the power plant is installed. The hydraulic driving connection, in addition to a driving element and an element driven thereby, includes an impeller, a rotor, and an oil-filled casing within which both the impeller and the rotor are enclosed. The impeller, as hereinafter more fully explained, may be made to function as the motor fly wheel, or if desired, may be separately formed and suitably connected therewith. Its construction is such that it is preferably enclosed for the major part within the confines of the rotor. In addition to the driving element (the motor crank-shaft) and the element to be driven thereby (the vehicle drive-shaft), the impeller comprises a hub-portion, radial blades, and an impeller disc carried jointly by the hub and blades. The rotation of the impeller throws the oil or other liquid confined to the oil-filled casing both radially and tangentially; radially due to centrifugal force and tangentially due to the impeller blade formation. The rotor, which receives its power impulse both directly and indirectly from the impeller, as intimated, is of a construction such that it partly surrounds the impeller. In diameter it is somewhat larger than the impeller and at or near its periphery is provided with an annular flange. Vanes or blades are formed on the inside face of the rotor (that face next adjacent the impeller) and on the under or inside face of the annular flange. These vanes are preferably integrally formed and so related to the impeller as to receive the impact of the oil or other liquid as it is thrown radially and tangentially against them. The driven element, i. e., drive shaft, is either directly or indirectly driven by the rotor. Accordingly, power is transmitted via the hydraulic driving connection from the power plant or motor crank-shaft to the drive-shaft and from the drive-shaft to the vehicle wheels.

The invention is further characterized by an auxiliary or disc clutch connection between the driving and driven elements. This connection, as distinguished from the more or less flexible connection provided by the hydraulic drive, is frictional and is to be used only in an emergency or under service conditions requiring a maximum of tractive effort. Preferably the clutch connection is confined to the oil-filled casing and comprises co-operating clutch members carried respectively by the impeller and the rotor. These co-operating clutch members are at all times yieldingly held in light frictional contact and can, should occasion demand, be brought firmly together manually by manipulation of a suitable clutch pedal which may or may not be conveniently situated in proximity to the driver's seat. By yieldingly maintaining the co-operating clutch members in light frictional contact, a flexible connection supplemental to the flexible hydraulic connection is produced.

An automobile having a power transmission device of the character described is especially commendable in view of its extreme ease and smoothness of operation, its flexibility of power and its adaptability to varied service conditions. With the motor throttled down and the brake set, it is possible to "idle" the machine without shifting the change speed gears, where such gears are provided. It is, moreover, readily possible to start in "high" by simply accelerating the motor. Due to the flexibility of the hydraulic driving connection, the "pick-up" is gradual and smooth and any and all tendency to overload or stall the motor is eliminated. No gear shifting for ordinary operation (starting and stopping) is required and only in an emergency or under extreme or unusual circumstances is it necessary to shift gears at all. What is true of the change speed mechanism is also true of the manually operated clutch as it is not intended that the clutch shall be used except in climbing a steep grade or under conditions requiring a quick get away without waiting momentarily for the rotor to absorb the requisite power.

Still other advantages and improved results are attainable and will be comprehended from the detail description to follow. That which is new and novel herein will be specifically pointed out in the claims.

Of the drawings, wherein like reference characters denote like or corresponding parts:

Fig. 1 is a side elevation of the power transmission device or mechanism, the fly wheel of the motor being shown in section.

Fig. 2 is a plan view of the device or mechanism illustrated in Fig. 1, the fly wheel being shown in elevation, Fig. 3 is a longitudinal horizontal sectional view partly broken away, Fig. 6 is a view similar to Fig. 3 illustrating a modification.

Figure 4:
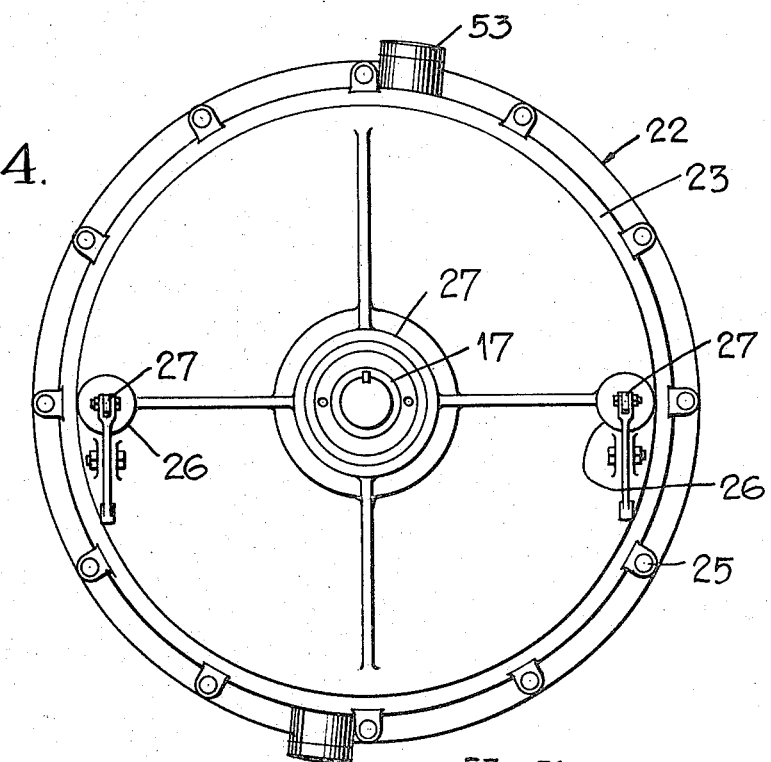
Fig. 4 is a face view of the oil-filled casing.

Before proceeding with a detail description of the construction and operation of our improved power transmission device, it is to be understood that we do not intend that its utility shall be limited to automobiles; nor do we intend to confine the invention to the use of oil. Obviously the device can be used on any and all types of automotive vehicles wherein power is transmitted from the power plant to the propelling means and, if desired, liquid other than oil can be satisfactorily used in effecting the hydraulic drive. Oil, however, is preferred in that it possesses sufficient body and at the same time eliminates all wear and tear on the moving parts. In using the term "driven element" we refer not alone to the drive-shaft but to the rotor shaft as well since the use of the change speed mechanism is optional and can be altogether omitted in which event the rotor shaft and the drive-shaft will be one and the same.

In the embodiment of our invention selected for illustration, 10 designates the hydraulic driving connection in its entirety, 11 the clutch and 12 the change speed gear mechanism. The power plant (not shown) includes a fly wheel 13 and a crank-shaft extension 14 where both the impeller and the fly wheel are used. Where the flywheel is dispensed with (see Fig. 6) and the impeller is made to function as such, the whole device can be brought forward and the oil-filled casing made integral with the motor crank-case 15. In either event the construction is generally similar and the operation exactly the same. The slight differences in construction which do exist are apparent upon a comparison of Fig. 3 and 6.

In Fig. 3 wherein the crank-shaft extension 14 is illustrated, a flexible coupling 16, between the shaft extension 14 and the impeller shaft 17 is used. This coupling or universal joint comprises a plurality of leather or fibre washers 18, small metal washers 19 interposed between the washers 18 and bolts 20, the latter extending not only thru both the washers 18 and 19 but thru arms or extensions 21 formed respectively on the shafts 14 and 17 which the coupling joins. A coupling thus constructed admits of slight play between the shaft 14 and 17 and is conducive to a more or less flexible drive. Considered collectively the shafts 14 and 17 and the coupling 16 constitute the driving element referred to in the claims.

Suitably supported upon a sub-frame (not shown) carried by the vehicle chassis is an oil-filled casing 22. In Fig. 3 the oil-filled casing is shown as comprising two connected casing sections 23 and 24 whereas in Fig. 6 three connected casing sections are used. This difference in construction is required for the reason that in one instance the casing 22 and the crank-case 15 are made integral whereas in the other instance they (the casing and the crank-case) are made as separate and distinctly different parts. In both forms the bolts 25 are used to fasten the casing sections together.

The forward casing section 23 of the casing 22, at diametrically opposite points, is depressed or enlarged as at 26 for a purpose later to be disclosed. Centrally it is enlarged to provide an extension 27 within which bearings 28 and 29 for the impeller shaft 17 are contained. At its forward end the extension 27 is internally threaded to receive a packing nut 30 which encircles the shaft 17 and at the same time provides an abutment for a spring 31 confined to the extension and abutting at its opposite end on the bearing 28. Like the enlargements 26, the function of the spring 31 will be hereinafter fully explained.

The rear casing section 24, though centrally enlarged to provide an extension 32, is characterized by an absence of enlargements corresponding with the enlargements 26 of the casing section 23. The extension 32, however, extends off or away from the casing section 24 in a direction opposite to that of the extension 27. It is somewhat larger than the extension 27 in diameter though comparatively short. At its outer end it is similarly internally threaded to receive a packing nut 33 and at or near its inner end is designed to receive a bearing 34 for the stub end 35 of the rotor 36 forming a part of the hydraulic driving connection.

In addition to the rotor 36, the hydraulic driving connection comprises an impeller 37. The impeller is mounted on the impeller shaft 17 and is adapted to rotate with it. It includes a hub portion 38, integral radial blades 39 and an annular integral disk 40. The disc 40, in diameter, (see Fig. 3) is somewhat larger than the impeller proper as measured from tip to tip of the impeller blades, and due to such difference in diameter there is provided, at or near the periphery of the disc, a flat annular surface hereinafter referred to as a bearing surface or clutch member 41. The disc, it will be noted, extends radially out from the impeller hub at or near its forward end and due to its integral formation with the impeller blades, tends to reinforce or strengthen them thruout. Moreover, being solid, its weight is added to that of the impeller, a desirable feature, especially where the impeller functions as the motor fly wheel. An annular flange 42 formed on the impeller shaft and secured to the impeller hub as at 43 affords a rigid connection therebetween.

Figure 5:
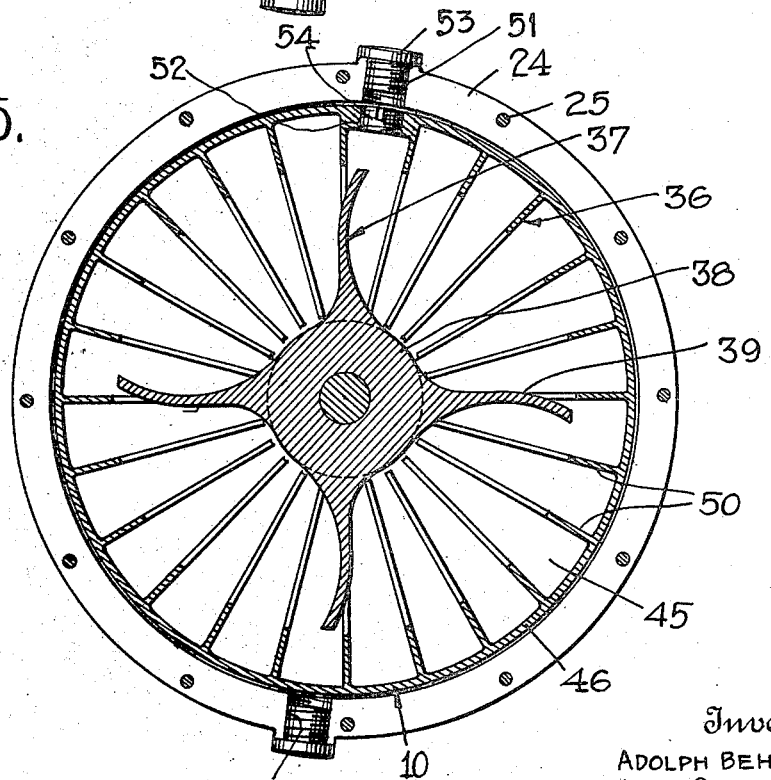
Fig. 5 is a section on the line 5—5 of Fig. 3.

Both the impeller 37 and the rotor 36 are mounted to operate at all times wholly immersed in oil. The oil-filled casing 22 is filled with oil and its construction is such that both the impeller and the rotor are enclosed entirely within its confines. The rotor, as intimated, includes a hub or stub end 35 into the central bore of which one end of the impeller shaft 17 is extended. A bearing 44 is enclosed in the bore of the hub 35 to properly support the shaft. From the hub or stub end the rotor extends outwardly or radially in the form of an annular disc 45 and thence forwardly and in the form of an annular flange 46 to a point adjacent to the bearing surface 41 of the impeller. The annular flange 46, in cross section, corresponds substantially to the inside configuration of the casing 22 and at its forward edge is inturned as at 47 to provide a bearing surface 48 adapted to co-operate with the bearing surface 41 above mentioned. Between the bearing surfaces 41 and 48 an annular band or ring 49 is interposed. This band, it will be noted, loosely encircles the impeller blades and is held in place by light frictional contact with the co-operating bearing surfaces. On the inside face of the flange 46 and on the inside face of the rotor disc 45 vanes 50 are formed. These vanes which are preferably of right angle formation and which are preferably integral, radiate from a point at or near the impeller hub over and parallel with the axis of which they extend. In other words, the shape of the vanes is such that they extend along or across one face of the impeller and at their outer ends overlap the impeller. Being thus arranged, obviously the rotation of the impeller immersed in oil, will throw the oil radially and tangentially; radially due to centrifugal force, and tangentially due to the blade formation and to the rotation of the impeller in a clockwise direction and according to the rotating speed of the shaft 14. The impeller blades (see Fig. 5) it will be noted, are curved slightly in the direction of rotation. Moreover, it will be noted by reference to this figure that the number of vanes formed on the rotor is far in excess of the number of blades formed on the impeller. For the purpose of filling the casing 22 with oil, an opening 51 is provided in the casing section 24 and an opening 52 is formed in the rotor flange 46. These openings, in filling the casing should be aligned. Normally, however, the openings are closed by a filler cap 53 for the opening 51 and a plug 54 for the opening 52. To drain the casing an opening 55 may be formed in the bottom of the casing.

To supplement the hydraulic driving connection between the driving and the driven element, the clutch 11 is provided. Normally the spring 31 tends to hold the clutch member 41 in light frictional contact with the co-operating clutch member 47. That this may be brought about the impeller shaft is given slight axial play in its bearings. When it is desired that the clutch members shall be brought into firm or positive frictional contact the clutch member 41, and consequently the impeller and impeller shaft are manually axially adjusted, roller bearings 56 having suitable operating mechanism 57 being provided for this purpose. These bearings 56 (see Fig. 3) are confined to the enlargements 26 formed in the forward casing section 23 of the oil-filled casing. By forcing the roller bearings inwardly against the impeller disc the clutch member 41 is adjusted. Such manual adjustment, however, as hereinbefore explained, is seldom required and is intended to be used only in an emergency or under service conditions requiring a maximum of tractive effort.

Coming now to a description of the change speed gear mechanism, likewise illustrated in detail in Fig. 3, it will be noted that such mechanism includes a countershaft 58, a sliding gear sleeve 59 and a plurality of change speed gears designated respectively 60, 61, 62, 63, 64, 65, 66, 67, 68, and 69. The gears 60, 61, 62 and 63 are carried by the gear sleeve 59, the gears 60 and 62 being externally formed on the sleeve and the gears 61 and 63 being internally formed. One internal gear of the sleeve 59 is at all times in mesh with a gear 70 formed on the rotor shaft 71. The rotor shaft is fastened as at 72 directly to the rotor and is journalled in bearings 73 and 74. These bearings are enclosed in an extension 75 of the change speed gear casing 76, the extension (see Fig. 3) being fastened or bolted as at 77 to the extension 32 of the casing section 24. The gear 70 formed on the rotor shaft is an elongated gear and is at all times in mesh with the sliding gear 61 of the gear sleeve 59. Being thus at all times in mesh the sleeve 59 is rotated at all times according to the rotating speed of the rotor. The other internal gear 63 of the sleeve 59 is shiftable with the sleeve into and out of mesh with the gear 64 which is carried by the drive shaft 78 of the vehicle. Both the drive shaft and the rotor shaft extend into the change speed gear casing 76, the one offering a bearing support for the other. Such bearing support is formed by providing the drive shaft 78 with an extension 79 and the rotor shaft 71 with a recess 80; fitting the extension within the recess; and interposing roller bearings 81 between the extension and the recessed walls. When the gears 63 and 64 are in mesh the drive shaft 78 is directly rotated according to the rotating speed of the rotor. When it is desired that the shaft 78 shall be idle without correspondingly idling the rotor, it is but necessary to shift the sleeve forwardly until the gear 60 is in mesh with the gear 67, the gear 69 at such time being out of mesh with the gear 65. The gear 69, carried by the counter-shaft, is shiftable. It is provided with a grooved collar 82 within the groove of which the prongs of a fork (not shown) are fitted. The fork (not shown) is adapted to be manually controlled from the driver's seat. In operation, the gear 69 is adapted to be thrown into and out of mesh with the gear 65. To reverse the direction of rotation of the shaft 78 the gear 62 is thrown into mesh by sliding movement of the sleeve 59 with the gear 66, the latter being at all times in mesh with the gear 68 mounted on the counter-shaft. The sleeve 59, like the gear 69 is provided with a grooved collar 85 within the groove of which the prongs of a second fork (not shown) are fitted. This fork, like the fork first mentioned, is likewise adapted to be operated or moved from the driver's seat. The gear 66 is mounted on a stub shaft journalled in suitable bearings carried by the change speed gear casing. The sleeve 59, as intimated, is jointly carried by the rotor shaft 71 and the drive shaft 78. It is shiftable, as explained, to any one of three positions. In any of such positions the gear 61 and the gear 70 are in mesh. To operate in "low" the sleeve 59 is shifted inwardly or toward the rotor until the gear 60 and the gear 67 are in mesh. Thus positioned the gears 63 and 64 are out of mesh and motion is transmitted to the drive shaft 78 from the rotor shaft 71 via the counter-shaft. To operate in "high" the sleeve is shifted to the position indicated in Fig. 3. Thus positioned the gears 63 and 64 are in mesh.

Although, as explained, the change speed gear mechanism illustrated, while not essential to the successful operation of the power transmission device, is nevertheless desirable in an emergency. For ordinary idling, with the motor throttled down and the brakes set, the rotation of the impeller 37 and its resulting action on the oil is insufficient to rotate the rotor. However, to insure idling with the machine at rest on a down grade or at rest with the brakes unset, it is possible to disengage the gear 69 and the gear 65 and at the same time shift the sleeve 59 into a position bringing the gears 60 and 67 in engagement. For ordinary operation no gear shifting whatsoever is required. Accordingly, the ease and utter simplicity of handling an automobile thus characterized means a higher degree of competence on the part of the driver however inexperienced. Moreover, as a result of the more or less flexible power transmission secured the machine is caused to operate at all speeds evenly and smoothly and without any tendency whatsoever to overload or stall the motor.

While we have described our invention in detail in its present preferred embodiment, it will be obvious to those skilled in the art after understanding our invention, that various changes and modifications may be made therein without departing from the spirit or scope thereof. We aim in the appended claims to cover all such modifications and changes.

What is claimed is:

1. A power transmission device for automotive vehicles including a driving element, an element to be driven thereby, an impeller movable with the driving element, a rotor movable with the driven element, the size of the rotor being such that the impeller is partly enclosed thereby, vanes formed on the rotor, each of the several vanes being inwardly extended in two directions toward the impeller, and an oil-filled casing within which both the rotor and the impeller are enclosed.

2. A power transmission device for automotive vehicles including a driving element, an element to be driven thereby, an impeller movable with the driving element, a motor movable with the driven element, the size of the rotor being such that the impeller is partly enclosed thereby, vanes formed on the rotor, each of the several vanes being respectively inwardly extended toward the outer periphery of and toward one face of the impeller, and an oil-filled casing within which both the rotor and the impeller are enclosed.

3. A power transmission device for automotive vehicles including a driving element, an element to be driven thereby, a multi-bladed impeller movable with the driving element, a rotor movable with the driven element, the outside diameter of the rotor being greater than the corresponding diameter of the impeller as determined by measurement of the impeller blades, vanes formed on the rotor, each of the several vanes being inwardly extended toward the impeller blades and at or near the outer periphery of the rotor being extended over and beyond the outer periphery of the impeller as determined by measurement of the impeller blades, and an oil-filled casing within which both the rotor and the impeller are enclosed.

4. A power transmission device for automotive vehicles including a driving element, an element to be driven thereby, an impeller movable with the driving element, a rotor movable with the driven element and comprising an annularly flanged disc within which the impeller is partly enclosed, angular vanes formed on the rotor to extend inwardly toward the impeller parallel with the axis of the rotor from the rotor disc and inwardly toward the impeller at right angles to the axis of the rotor from the rotor flange, and an oil-filled casing within which both the rotor and the impeller are enclosed.

5. In a power transmission device for automotive vehicles, the combination of a driving element, an element to be driven thereby, an hydraulic driving connection between the driving and the driven element, an auxiliary clutch connection between said elements adapted to supplement the hydraulic drive, and a stationary oil-filled casing within which the impeller, the rotor, and the auxiliary clutch connection are all completely enclosed.

6. In a power transmission device for automotive vehicles, the combination of a driving element, an element to be driven thereby, an hydraulic driving connection between the driving element and the driven element comprising an impeller and a rotor, an auxiliary clutch connection between said elements formed respectively on the impeller and the rotor and adapted to supplement the hydraulic drive, and an oil-filled casing, fixed as regards both the driving element and the driven element, within which the rotor, the impeller, and the auxiliary clutch connection are all completely enclosed.

7. In a power transmission device for automotive vehicles, the combination of a driving element, an element to be driven thereby, an hydraulic driving connection between the driving element and the driven element comprising an impeller and a rotor, one of which last mentioned elements is movable toward and away from the other, an auxiliary clutch connection between said driving and said driven elements comprising clutch members formed respectively on the impeller and the rotor, an oil-filled casing fixed as regards the driven element and the driving element, within which the rotor and the impeller are enclosed, and means extending through said casing for moving the clutch members into and out of engagement whereby the clutch connection between the driving element and the driven element may supplement the hydraulic drive.

8. In a power transmission device for automotive vehicles, a driving element, an element to be driven thereby, an impeller movable with the driving element and comprising a hub portion, blades arranged radially about the hub portion, an annular disc carried jointly by the impeller blades and the hub, a rotor movable with the driven element, an oil-filled casing within which both the rotor and the impeller are enclosed, an annular bearing surface formed on the rotor and means operable to engage and disengage the impeller disc and bearing surface whereby a clutch connection between the impeller and the rotor is evolved.

9. In a power transmission device for automotive vehicles, a driving element, an element to be driven thereby, an impeller movable with the driving element, an annular bearing surface formed on the impeller, a rotor movable with the driven element and extended over and beyond the outer periphery of the impeller, a co-operating annular bearing surface formed on the extended portion of the rotor, means to move the co-operating bearing surfaces into and out of engagement whereby a clutch connection between the impeller and the rotor is evolved, and an oil-filled casing within which the rotor and the impeller and the clutch connection are all completely enclosed.

10. In a power transmission device for automotive vehicles, a driving element, an element to be driven thereby, an impeller movable with the driving element and comprising an annular disk, a hub, and a plurality of radial blades, the disk being extended beyond the ends of the blades to provide an annular clutch member movable with the impeller, a rotor movable with the driven element and comprising an annular inwardly extending flange having at its outer end a cooperating clutch member, the bearing surface of which is substantially complementary to the clutch member first mentioned, means to throw the clutch members into and out of engagement by axial movement of the impeller, and an oil-filled casing within which the rotor, the impeller, and the cooperating clutch members are all completely enclosed.

11. In a power transmission device for automotive vehicles, a driving element, an element to be driven thereby, an impeller movable with the driving element, a clutch member carried by the impeller, a rotor movable with the driven element, a co-operating clutch member carried by the rotor, spring means arranged to yieldingly hold the cooperating clutch members in engagement one with the other, and an oil-filled casing within which both the rotor and the impeller are enclosed.

In testimony whereof we hereunto affix our signatures.

ADOLPH BEHN.
JOHN GUSTAV SCHMITT.